Jan. 7, 1969  H. TAUSCHER  3,420,113
VARIABLE SPEED MECHANISM
Filed Dec. 12, 1966
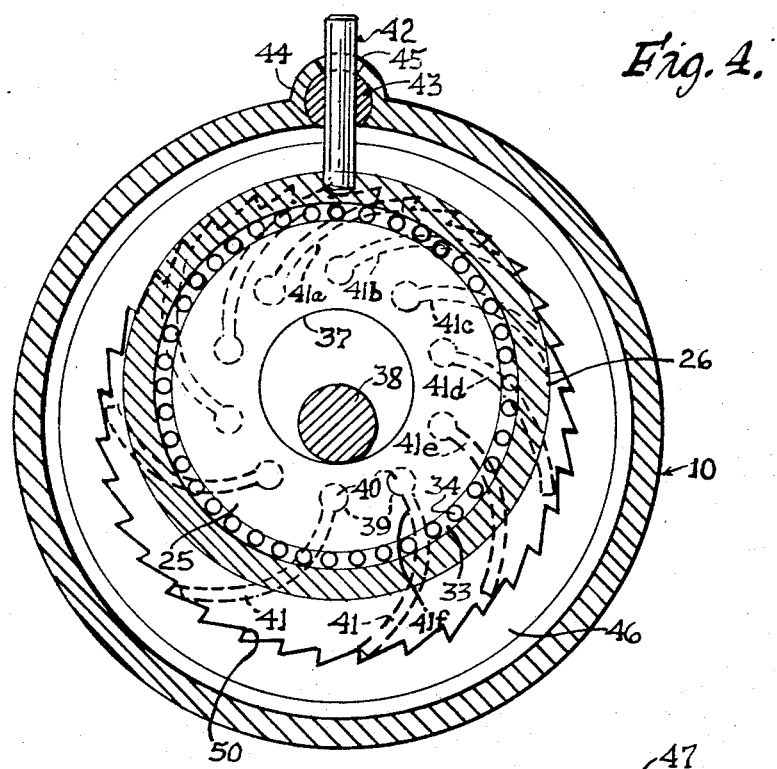
Fig. 4.
Fig. 6.
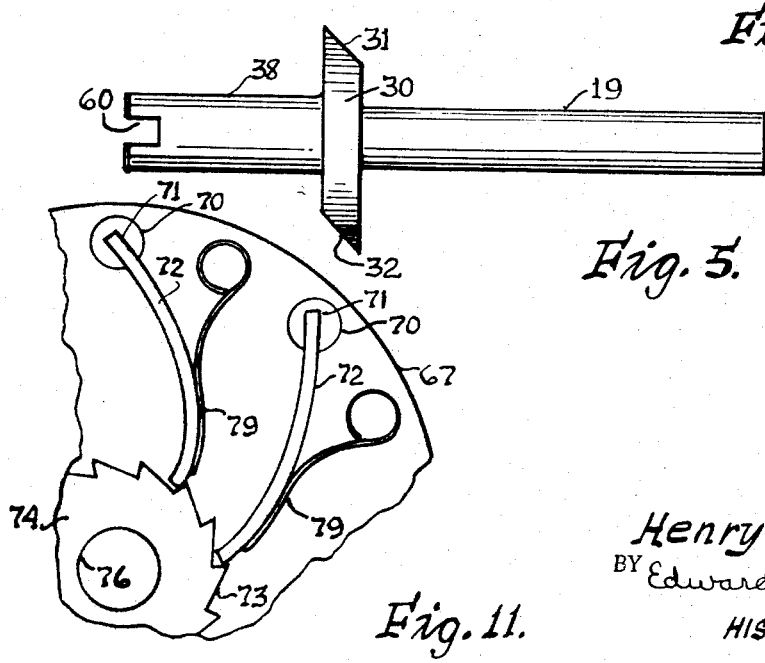
Fig. 5.
Fig. 11.
INVENTOR.
Henry Tauscher
BY Edward C. Threedy
HIS ATTORNEY.

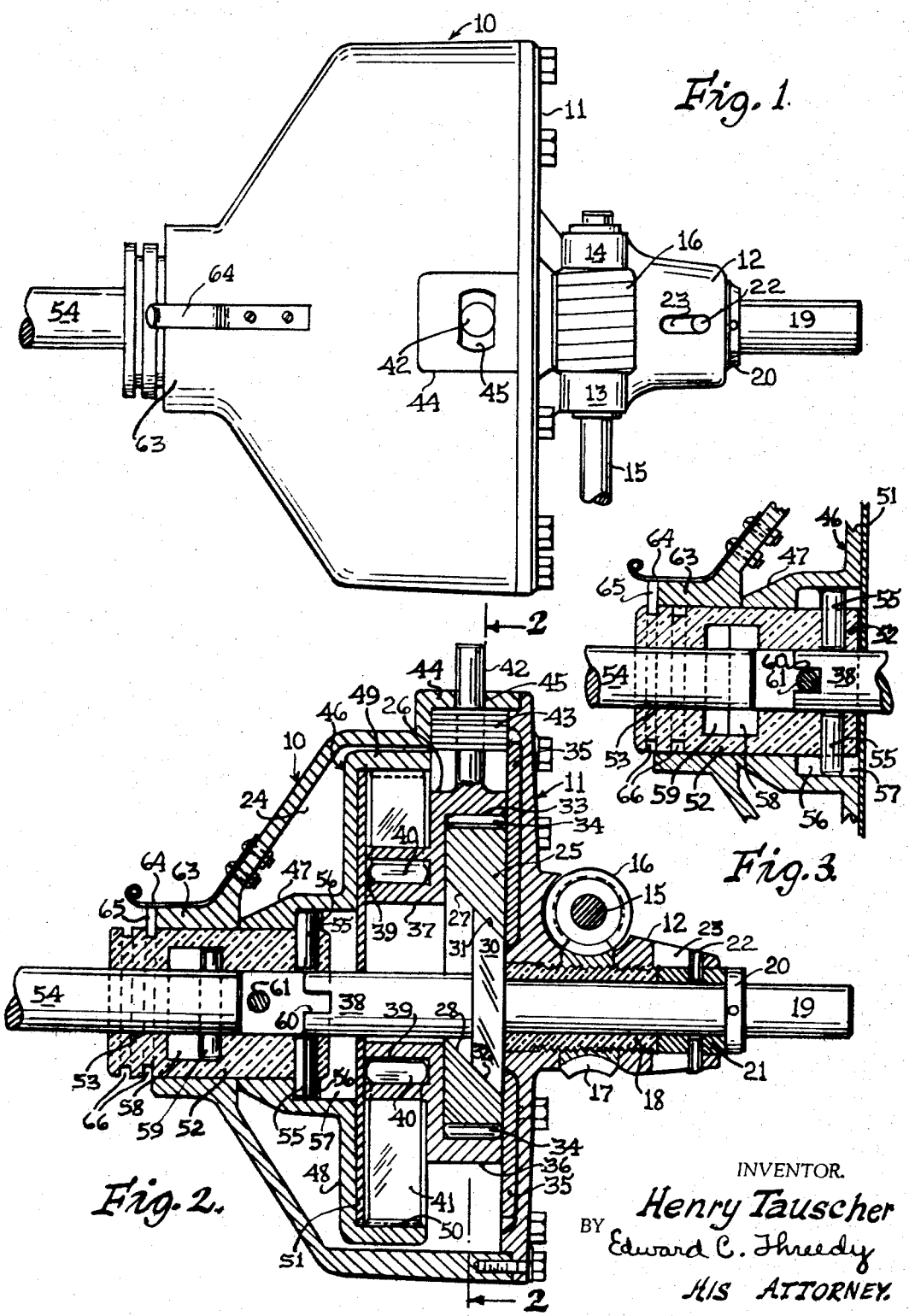

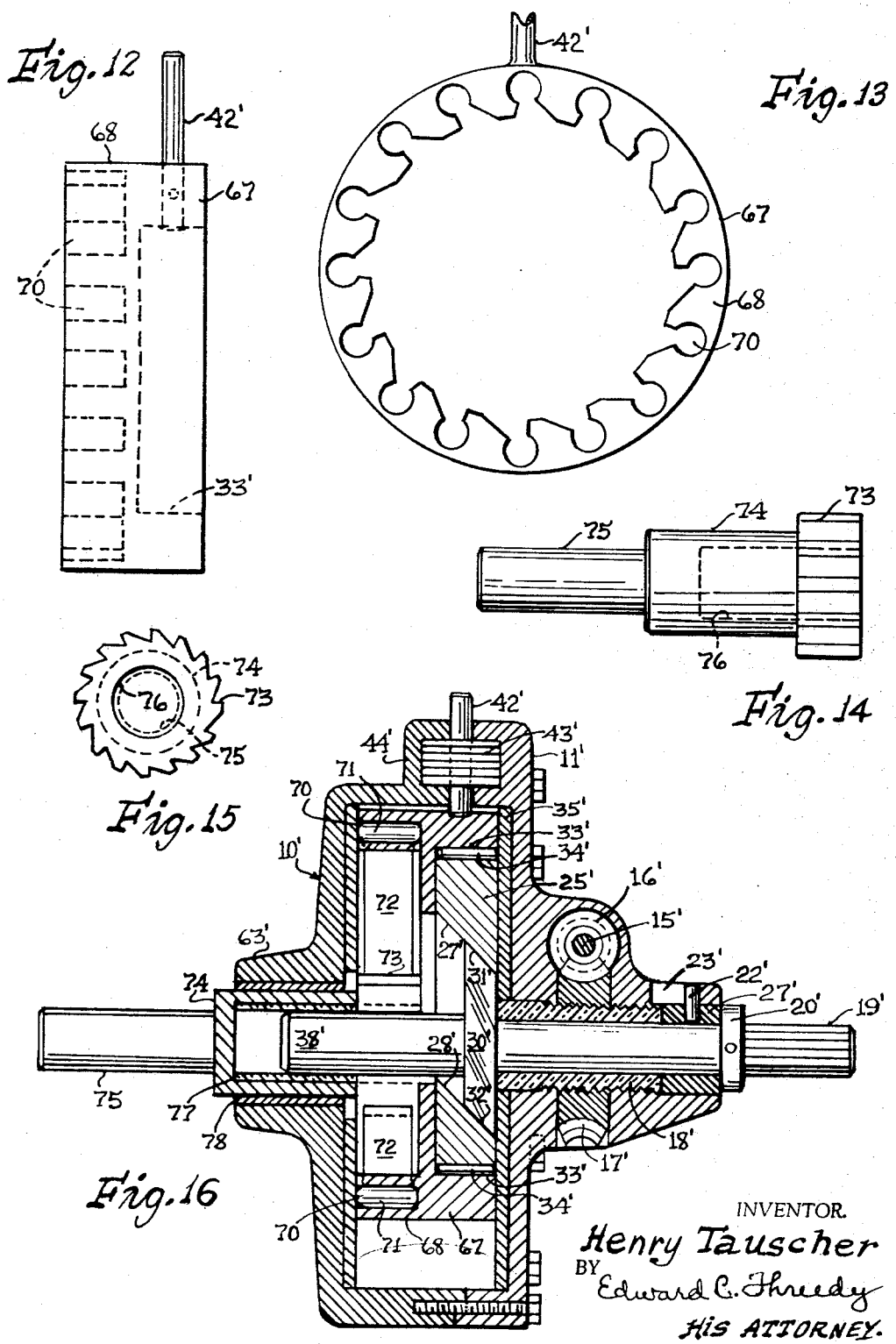

United States Patent Office 3,420,113
Patented Jan. 7, 1969

3,420,113
VARIABLE SPEED MECHANISM
Henry Tauscher, Oak Park, Ill., assignor to Triple H Transmission Corporation, Chicago, Ill., a corporation of Illinois
Filed Dec. 12, 1966, Ser. No. 600,816
U.S. Cl. 74—63                10 Claims
Int. Cl. F16d 3/10

ABSTRACT OF THE DISCLOSURE

A variable speed mechanism to be inserted between a drive shaft and a driven shaft having an eccentric selector fixedly connected to and rotated by the drive shaft which in turn oscillates a drive plate within a housing, which drive plate provides a plurality of flexible pawls extending substantially radially from a center hub thereof and engage the teeth of a driven member. The driven member by a ball connection to the housing is moved through an orbital path about the axis of the drive shaft. The oscillating drive plate has a key connection to a rotatable bushing journalled in the housing and which bushing is in turn keyed to the driven shaft so as to effect rotation thereof in response to the orbital movement of the driven plate. The bushing may be moved longitudinally of the driven shaft to disengage it from the driven plate as well as to effect a positive drive connection with the drive shaft, all for the purpose of obtaining differential rotation between the drive shaft and the driven shaft.

---

The invention claimed in this application is directed to apparatuses classified in Class 74, Machine Elements and Mechanisms, and differs from the prior art found in such classification by describing and claiming a mechanism which includes an orbiting drive plate provided with means having driving connection with a driven member carried by a driven shaft. The means providing the driving connection comprises a plurality of yieldable pawls which by an eccentrically rotated drive member are sucessively compressed so as to effect a rotating movement in one direction onto the driven member which in turn rotates the driven shaft.

The invention will be best understood by reference to the accompanying drawings, in which:

FIG. 1 is a top plan view of the mechanism of this invention;

FIG. 2 is a detailed sectional view showing the operative parts of the invention;

FIG. 3 is a fragmentary detailed view showing certain of the operative parts of the invention in one position;

FIG. 4 is a fragmentary detailed sectional view taken along lines 4—4 of FIG. 2;

FIG. 5 is a perspective view of the drive shaft and cam member of this invention;

FIG. 6 is a detailed sectional view of one of the yieldable pawls employed in this invention;

FIG. 11 is a modified form of a driving pawl as utilized in this invention;

FIG. 12 is a side elevational view of a modified form of an orbiting drive plate as utilized in this invention;

FIG. 13 is a front elevational view of a modified orbiting drive plate;

FIG. 14 is a side view of the drive member utilized in the modified variable speed mechanism;

FIG. 15 is a front elevational view of the drive member shown in FIG. 13;

FIG. 16 is a detailed sectional view of the modified variable speed mechanism of this invention.

Figure 7:
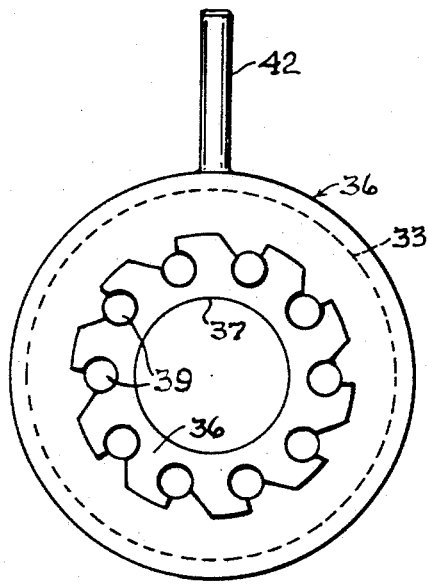
FIG. 7 is a side elevational view of the oscillating drive plate of this invention.
Figure 10:
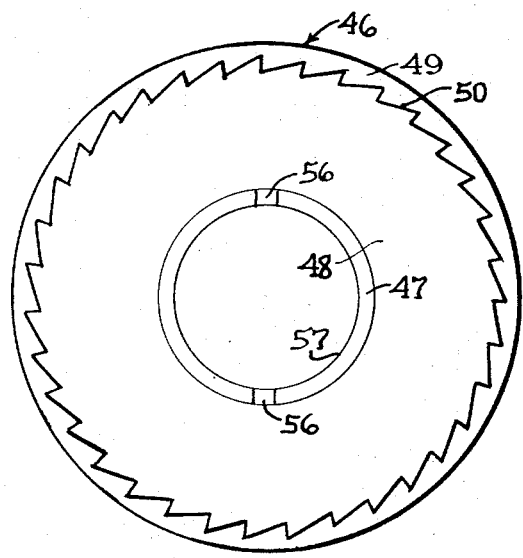
FIG. 10 is a front elevational view of the driven member of this invention.
Figure 8:
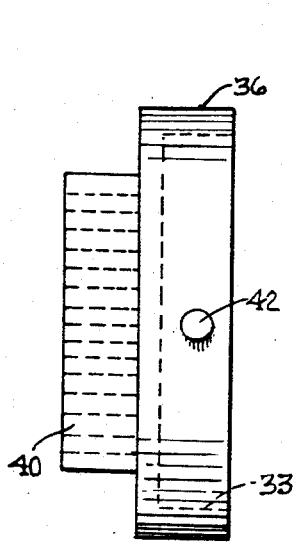
FIG. 8 is a top plan view of the oscillating drive plate of this invention.
Figure 9:
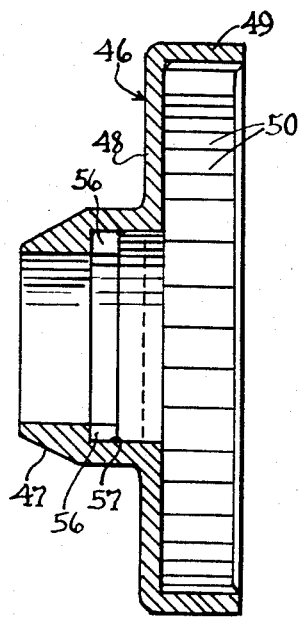
FIG. 9 is a detailed sectional view of the driven member as employed in this invention.

In the preferred embodiment of the invention there is provided a housing 10 including a side cover 11 providing a hub 12 having spaced lugs 13 and 14 through which is journaled a control shaft 15. The control shaft 15 carries a worm gear 16 in threaded contact with a worm wheel 17 which in turn is threaded upon a slidable screw sleeve 18 freely journaled on a drive shaft 19. A collar 20 is connected to the drive shaft 19 and functions to retain a bushing 21 thereupon, which bushing 21, by dowel pins 22 projecting through slots 23 formed in the hub 12, is restrained against rotation with the drive shaft 19. By this arrangement longitudinal movement of the drive shaft 19 through the hub 12 is accomplished by gear action between the worm gear 16, worm wheel 17 and the screw sleeve 18, all responsive to the rotation of the control shaft 15.

The housing 10 and cover 11 form a cavity 24 containing a circular drive disc 25 and an oscillating drive plate 26. Drive disc 25 is provided with a center rectangularly shaped opening having its short top and bottom walls 27 and 28 parallelly tapered, as seen in FIG. 2. The drive shaft 19 has fixedly connected thereto a rectangularly shaped cam head 30 having parallel tapered end walls 31 and 32 corresponding to and in facial slidable abutment with the tapered walls 27 and 28 defining the center opening formed in the drive disc 25. As the drive shaft 19 is movable axially through the cavity 24 by the worm gear 16, worm wheel 17 and screw sleeve 18, the cam action of the cam head 30 against the tapered walls 27 and 28 of the drive disc 25 will determine the position of the drive disc 25 within the cavity 24 relative to the longitudinal axis of the drive shaft 19.

One face of the oscillating drive plate 26 is formed to provide a recessed circular raceway 33 containing a set of roller bearings 34 positioned about the periphery of the drive disc 25, which has a diameter such that it can be inserted into the raceway 33 of the drive plate 26 as seen in FIG. 2. The roller bearings 34 as well as the drive disc 25 are all retained within the raceway 33 by a circular spacer plate 35 interposed beneath the cover 11.

The drive plate 26 provides on its opposite face a shoulder 36 defining an enlarged center bore 37 through which the free end 38 of the drive shaft 19 extends beyond the cam head 30. The shoulder 36 has formed therein a plurality of sockets 39 adapted to receive the end ball joints 40 of yieldable actuating pawls 41. By this arrangement the actuating pawls 41 are carried by the drive plate 26 and have their free ends extending in an outwardly 26 and have their free ends extending in an outwardly arcuated direction from the shoulder 36.

A vertical stem 42 projects from the drive plate 26 and is freely projected through a ball joint 43 retained in a circular seat 44 formed in the top of the housing 10, with the free end of the stem 42 projecting out of an elongated slot 45 formed in the top portion of the housing 10, as seen in FIGS. 1, 2 and 4. Through the employment of the ball joint 43 and stem 42, the drive plate 26 is free to oscillate through an orbital path about the drive shaft 19, with the orbital path determined by the position of the cam head 30 in the center opening of the drive disc 25, which drive disc 25 in turn bears against the walls of the raceway 33 formed in the one face of the plate 26 as hereinbefore described.

Also contained within the cavity 24 of the housing 10 is a driven member 46. This member 46 includes an enlarged hub 47 having a circular hub flange 48 extending circumferentially therefrom and terminating into a peripheral flange 49. The interior face of the peripheral flange 49 provides a plurality of teeth 50 which are adapted to be engaged by the free ends of the drive pawls 41 carried by the oscillating drive plate 26. When the driven member 46 is placed within the cavity 24, a spacer plate 51 is positioned within the peripheral flange 49 so as to function to retain the pawls 41 in their socket connection with the drive wheel 36.

The hub 47 of the driven member 46 embraces a rotatable bushing 52 which has formed therethrough a center opening 53 adapted to accommodate one end of the driven shaft 54 and through which from an opposite direction projects the free end of the drive shaft 38. The bushing 52 is connected to the hub 47 by a set of pins 55 which project into pockets 56 formed in an enlarged counterbore 57 formed centrally within the hub 47. The bushing 52 also provides a circular recess 58 to accommodate a connecting pin 59 journalled through the free end of the driven shaft 54. By this arrangement, the driven member 46 by pins 55 is connected to the bushing 52 and the driven shaft 54 is likewise connected to the bushing 52 by pins 59. The bushing 52 may be disconnected from the hub 47 of the driven member 46 by axial movement relative to the shaft 38 or in a direction from left to right as viewed in FIG. 3, so as to displace pins 55 laterally out of the pockets 56 formed in the counterbore 57 of the hub 47. By this method of disconnecting the bushing 52 from the hub 47, no rotational driving force is imparted to the driven shaft 54. The lateral movement of the bushing 52 with respect to the driven shaft 54 is permitted, by reason of the connecting pin 59 being received in the recess 58, whereby a limited lateral movement of the bushing 52 with respect to the driven shaft 54 is achieved.

The free end of the drive shaft 38 is bifurcated as at 60 so as to receive a connecting pin 61 which projects radially between the walls defining the opening 53 formed in the bushing 52. By this latter arrangement of parts when the drive shaft 19 and its free end portion 38 are moved axially from right to left as viewed in FIG. 3, the full distance of the threaded sliding screw 18, and the bushing 52 is moved inwardly of the housing 10 and hub 47 in a direction from left to right as viewed in FIG. 2, the pin 61 will be inserted into the bifurcation 60, creating a positive connection between the drive shaft 19 and the driven shaft 54, as shown in FIG. 3.

To permit the axial movement of the bushing 52, the housing 10 provides at its bearing end 63 a spring leaf 64 providing a retaining lug 65 at its free end, which is normally urged into one of a plurality of circular grooves 66 formed in the exposed end of the bushing 52.

In the operation of the mechanism including the structural elements hereinbefore described and particularly the condition of such elements as shown in FIG. 2 which illustrates the maximum driving connection between the drive shaft 19 and driven shaft 54, it is shown that the sliding screw sleeve 18 is approximately at one end of its threaded connection with the worm wheel 17. In the position shown in FIG. 2, the drive shaft 19 and its integrally connected cam head 30 and free end 38, are all positioned so that the drive disc 25, by reason of the engagement of the tapered walls 27 and 28 formed in the central opening thereof and the tapered walls 37 and 38 of the cam head 30, is positioned in a radial offset relation with respect to the longitudinal axis of the drive shaft 19. This radial offset position of the drive disc 25 produces corresponding radial offset position of the oscillating drive plate 26 such that certain of the pawls 41 carried thereby are in a substantial compressed condition against the teeth 50 formed in the inner face of the peripheral flange 49 of the driven member 46, as shown in FIG. 4.

As the drive shaft 19 is rotated, the cam head 30 and drive disc 25 are likewise rotated about the center axis of the drive shaft 19 so as to effect a circular orbital movement of the oscillating drive plate 26 about the drive shaft 19, effecting a progressive compression of the pawls 41 against the teeth 50 of the driven member 46 to cause corresponding rotation in a like direction of the driven member 46, bushing 52, and driven shaft 54. As viewed in FIG. 4, the pawls 41a, 41b, and 41c are under compression by reason of the position of the oscillating drive plate 26 within the housing 10. Continuing compression will be imparted to pawls 41d, 41e, and 41f, as the orbital path of the oscillating drive plate 26 moves about the center axis of the drive shaft 19, with the rotating disc 25.

It is readily apparent that by the arrangement of parts hereinbefore described, a constant driving condition is maintained successfully through the pawls 41 in engagement with the teeth 50 of the driven member 46 as the shaft 19 is rotated. It should also be noted that by the eccentric condition resulting from the sloping walls 37 and 38 of the cam head 30 in selected engagement with the corresponding sloping walls 27 and 28 of the center opening formed in the drive disc 25, the oscillating drive plate 26 through its connection with the ball joint 43 is permitted to orbit through a predetermined path within the housing 10 and about the free end 38 of the drive shaft 19.

If a lesser degree of rotation of the driven shaft 54 is desired, the control shaft 15 may be rotated in a clockwise direction as seen in FIG. 2, to effect threading a corresponding axial movement of the shaft 19 inwardly of the housing 10 or in a direction from right to left as seen in FIG. 2, so as to have the cam head 30 move inwardly of the opening 32 formed in the drive disc 25 and, by a camming action betwen its tapered walls and the corresponding walls of the drive disc 25, adjust the eccentric rotation of the drive disc 25 as well as the orbital movement of the oscillating drive plate 26 about the free end 38 of the drive shaft 19. This adjustment effects the amount of compression of the driving pawls 41 and their driving engagement with the teeth 50 of the driven member 46 so that they approach a more uniform compression relation to the central axis of the drive shaft 19. If the drive shaft 19 together with its cam head 30 is moved axially into the housing 10 to its maximum length as permitted by the sliding screw 18, the drive disc 25 as well as the oscillating drive plate 26 will be circumferentially arranged about the central axis of the free end 38 of the drive shaft 19, thus producing a minimum degree of corresponding rotation upon the driven shaft 54.

If a corresponding degree of rotation is desired between the drive shaft 19 and the driven shaft 54, or if no rotation is desired at all upon the driven shaft 54, the structural elements may be arranged so as to be related in the manner hereinbefore described.

Referring to FIG. 15, there is shown a modified mechanism wherein the drive member 46 as utilized in the preferred form of construction as illustrated in FIG. 2, is omitted.

The mechanism of FIG. 15 includes like components shown and described with respect to FIG. 2, all of which bear identical reference numerals primed. In place of the omitted drive member 46, in the modified form the oscillating plate 67 is provided with peripheral flange 68, the inner face of which provides a plurality of sockets 70 which seat the socket joints 71 of driving pawls 72. The driving pawls 72 extend in an inwardly arcuated direction and have their free ends in driving contact with the teeth 73 carried at the cup end 74 of a driven shaft 75. The cup end 74 of the driven shaft 75 provides an end recess 76 which receives a bushing 77 as well as the free inner end 38' of the drive shaft 19'. The cup end 74 is journalled through a suitable bushing 78 seated in the opening formed in the end hub 63' of the housing 10'.

The operation of the mechanism is identical to that described with respect to FIG. 7, with the exception that the oscillating plate 67 moves in an orbital path about the teeth 73 formed on the driven shaft 75 and successively compresses the driving pawls 72 thereagainst to impart rotation thereto.

In FIG. 11, there is shown a fragmentary view of the oscillating plate 67 wherein the driving pawls 72 have their free ends held in driving contact with the teeth 73 of the driven shaft 75 by leaf spring 79. The employment of the leaf springs 79, while not considered essential to the operation, are included only to show that in the event the pawls 72 have a tendency to disengage from the teeth 73 when in their most relaxed condition, the utilization of a retaining spring, such as leaf spring 79, would readily overcome this undesired function.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A variable speed mechanism, including a housing for the opposing ends of a drive shaft and a driven shaft, and a gear arrangement for axially moving the drive shaft within the housing wherein the improvement comprises:
   (a) a circular drive member within said housing rotatable with said drive shaft and movable radially with respect thereto so as to be adjustably positioned from a concentric to an eccentric position about said drive shaft,
   (b) means carried by said drive shaft rotatably and adjustably connecting said circular drive member thereto,
   (c) a drive plate within said housing in contact with said circular drive member and oscillated about said drive shaft by rotational movement of said circular drive member when the latter is in an eccentric position about said drive shaft,
   (d) connecting means between said drive plate and the housing providing a point from which said drive plate will oscillate about said drive shaft,
   (e) a driven member within said housing and having a peripheral portion extending about and spaced from a portion of said drive plate,
   (f) driving means carried by said drive plate engaging and rotating said driven member within said housing when said drive plate is oscillated by rotation of said drive member and said drive shaft,
   (g) interconnecting means journaled about the inner end of the driven shaft providing driving connection between said driven member and said driven shaft for rotating the latter at a rotational speed responsive to the axial position of said drive shaft and said drive member relative to said drive plate, and
   (h) means for releasably positioning said interconnecting means longitudinally on said driven shaft for disengaging said interconnecting means from said driven member to disrupt the driving connection between said driven member and said driven shaft and to connect said driven shaft to said drive shaft for rotation therewith.

2. A variable speed mechanism as defined by claim 1 wherein said means carried by said drive shaft rotatably and adjustably connecting said circular drive members thereto comprises a cam member mounted on and movable axially with said drive shaft within the housing, said circular drive member providing an opening therein about said shaft and having corresponding cam surfaces in contact with said cam member for radially positioning said circular drive member relative to the axis of said shaft as said shaft and said cam member are moved axially through said housing.

3. A variable speed mechanism as defined by claim 1 wherein said driving means carried by said by said drive plate comprises flexible pawls carried by said drive plate, and having their free ends in engagement with the peripheral portion of said driven member and compressed there against by oscillation of said circular drive member to rotate said driven member and said driven shaft connected thereto at a predetermined speed relative to said drive shaft.

4. A variable speed mechanism as defined by claim 3 wherein said means carried by said drive shaft rotatably and adjustably connecting said circular drive member thereto comprises a cam member mounted on and movable axially with said drive shaft within the housing, said circular drive member providing an opening therein about said shaft and having corresponding cam surfaces in contact with said cam member for radially positioning said circular drive member relative to the axis of said shaft as said shaft and said cam member are moved axially through said housing.

5. A variable speed mechanism as defined by claim 1 wherein said interconnecting means includes a rotating bushing keyed to said driven member and said driven shaft for rotating the latter as the bushing is rotated by said driven member, and means for releasably positioning said bushing relative to said driven member and for movement longitudinally on to said drive shaft for disengaging said bushing from said driven member to disrupt the driving connection between said driven member and said driven shaft, and for connecting said drive shaft to said driven shaft for rotating the latter.

6. A variable speed mechanism as defined by claim 5 wherein said means carried by said drive shaft rotatably and adjustably connect said circular drive member thereto comprises a cam member mounted on and movable axially with said drive shaft within the housing, said circular drive member providing an opening therein about said shaft and having corresponding cam surfaces in contact with said cam member for radially positioning said circular drive member relative to the axis of said shaft as said shaft and said cam member are moved axially through said housing.

7. A variable speed mechanism as defined by claim 5 wherein said driving means carried by said drive plate includes flexible pawls carried by said drive plate, and having their free ends in engagement with the peripheral portion of said driven member and compressed there against by oscillation of said circular drive member to rotate said driven member and said driven shaft connected thereto at a predetermined speed relative to said drive shaft.

8. A variable speed mechanism as defined by claim 4 wherein said interconnecting means comprises a rotating bushing keyed to said driven member and said driven shaft for rotating the latter as the bushing is rotated by said driven member, and means for releasably positioning said bushing relative to said driven member and for movement longitudinally on to said drive shaft for disengaging said bushing from said driven member and said driven shaft, and for connecting said drive shaft to said driven shaft for rotating the latter.

9. A variable speed mechanism as defined by claim 1 wherein said connecting means between said drive plate and the housing comprises a ball joint retained in a circular seat provided by the housing and an elongated stem extending radially from said drive plate and freely carried by said ball joint so that said drive plate will oscillate about said drive shaft within said housing under rotational movement of said circular drive member when the latter is in an eccentric position about said drive shaft.

10. A variable speed mechanism as defined by claim 8 wherein said connecting means between said drive plate and the housing comprises a ball joint retained in a circular seat provided by the housing and an elongated stem extending radially from said drive plate and freely carried by said ball joint so that said drive plate will oscillate about said drive shaft within said housing under rotational movement of said circular drive member when the latter is in an eccentric position about said drive shaft.

References Cited

UNITED STATES PATENTS

| | | | |
|---|---|---|---|
| 787,080 | 4/1905 | Conant | 74—793 |
| 2,033,639 | 3/1936 | Lotts | 74—571 |
| 2,379,454 | 7/1945 | Nowka | 74—63 |
| 2,521,711 | 9/1950 | Galliano | 74—571 |
| 3,074,294 | 1/1963 | Woolley | 74—805 |
| 3,119,280 | 1/1964 | Mann et al. | 74—571 |
| 3,199,361 | 8/1965 | Prins | 74—571 |

FRED C. MATTERN, JR., *Primary Examiner.*

W. S. RATLIFF, *Assistant Examiner.*

U.S. Cl. X.R.

74—571, 793, 805; 308—237